United States Patent [19]

Soeda

[11] Patent Number: 5,504,584
[45] Date of Patent: Apr. 2, 1996

[54] VIDEO MOVIE CAMERA CAPABLE OF STILL PHOTOGRAPHY USING A STROBOSCOPIC FLASH

[75] Inventor: Haruo Soeda, Tokyo, Japan

[73] Assignee: Fuji Photo Film Co., Ltd., Japan

[21] Appl. No.: 826,980

[22] Filed: Jan. 28, 1992

[30] Foreign Application Priority Data

Jan. 30, 1991 [JP] Japan ................................. 3-010115
Feb. 7, 1991 [JP] Japan ................................. 3-016544

[51] Int. Cl.$^6$ ............................................. H04N 5/225
[52] U.S. Cl. ..................... 358/335; 358/906; 358/909.1; 348/371; 348/221
[58] Field of Search .................................... 358/335, 906, 358/909, 209, 229, 213.13, 345, 310, 332; 360/33.1, 3; 348/220, 221, 370, 371; H04N 5/30, 5/14, 5/225

[56] References Cited

U.S. PATENT DOCUMENTS

| | | | |
|---|---|---|---|
| 4,746,988 | 5/1988 | Nutting et al. | 358/909 |
| 4,788,565 | 11/1988 | Masuda et al. | 354/75 |
| 4,825,290 | 4/1989 | Iida et al. | 358/229 |
| 4,827,332 | 5/1989 | Miyake et al. | 358/909 |
| 4,829,383 | 5/1989 | Harase et al. | 358/229 |
| 4,829,384 | 5/1989 | Iida et al. | 358/229 |
| 4,937,673 | 6/1990 | Saito et al. | 358/909 |
| 4,943,867 | 7/1990 | Suetaka et al. | 358/909 |
| 5,189,524 | 2/1993 | Yoshida et al. | 358/906 |
| 5,202,798 | 4/1993 | Takei et al. | 358/906 |
| 5,218,451 | 6/1993 | Kodama et al. | 358/906 |
| 5,229,856 | 7/1993 | Koshiishi | 358/909 |

Primary Examiner—Howard W. Britton
Assistant Examiner—Khoi Truong

[57] ABSTRACT

The present invention relates to a video camera having a stroboscopic flash, and a method of photographing a subject with the video tape recorder. The video camera includes a strobe device for illuminating the subject with a flashing light, a movie photographing trigger serving as a movie photographing button, a still photographing trigger for initiating still photography, an image processing unit for energizing the movie photographing trigger so as to measure light quantity from the subject during a movie photography operation, and a control unit for determining based on information about the light quantity measured by the image processing unit whether or not strobe photography is required during a still photography operation. According to the above construction, the strobe photography can automatically and immediately be performed upon the still photography operation when the still photography is initiated in the course of the movie photography. When it is desired to still-photograph the subject with the automatic flashing light of the strobe device, the level at which the strobe device has been charged can reliably be confirmed by using a display unit in a viewfinder.

11 Claims, 5 Drawing Sheets

VIDEO MOVIE CAMERA CAPABLE OF STILL PHOTOGRAPHY USING A STROBOSCOPIC FLASH

BACKGROUND OF THE INVENTION

1. Field of the Invention

The present invention relates to a video camera having a stroboscopic flash, which permits still photography during a movie photography operation and to a method of photographing a subject with the video camera.

2. Description of the Related Art

There has recently been widespread a movie camera in view of the fact that a motion picture (hereinafter called a "movie") can easily be photographed. When this type of movie camera is used to take a video of an object or subject during movie photography, there has been a demand for the photography of a desired still picture (hereinafter called a "still") of the object to be photographed. In this case, the still photography becomes frozen or motionless in a short period of time as compared with the movie photography. It is therefore necessary to use a strobe as an illuminating or flashing means in order to correct for insufficient light quantity.

In a conventional camera dedicated to the still photography, the light quantity is measured when a shutter button is half-pressed. When it is desired to automatically illuminate an object with a flashing light from a strobe at the synchronizing frequency in cooperation with underexposure and backlight, the time (hereinafter called "strobe charging time") required to charge the strobe is needed, thereby delaying the shutter timing by the strobe charging time. Thus, when an intended object to be photographed is not fixed, the shutter cannot be released or snapped unless the strobe is fully charged. Therefore, a photographer often misses an opportunity of a shutter operation. In addition, the charging of the strobe at a rapid speed greatly decreases the life of a battery. Furthermore, when the light quantity is measured at all times to avoid the above-described inconvenience, the power consumption of the battery is greatly increased, thereby causing reduced efficiency.

Let's now consider a video camera, which is provided with a still photographing function and a strobe. Under this condition, when it is desired to determine based on the presence or absence of a charging sound of the strobe whether or not the strobe has fully been charged, the movie photography is apt to record the charging sound of the strobe as noise. Further, the provision of a lamp used to indicate the completion of the charging of the strobe in the vicinity of a viewfinder causes inconvenience that the turning on of the lamp should be confirmed while the photographer takes his eyes off the viewfinder during a movie photography operation.

SUMMARY OF THE INVENTION

It is a principal object of the present invention to provide a video camera having a stroboscopic flash, of a type wherein a strobe is firstly charged at the time that a movie camera is used to carry out movie photography, thereby enabling momentary strobe photography when it is desired to carry out desired still photography in the course of the movie photography and providing less power consumption of a battery as compared with a conventional battery, and the strobe can secondly be charged without mixing a microphone with noise at the time of the movie photography and the level at which the strobe has been charged can easily be confirmed, and to provide a method of photographing an object with the video tape recorder.

It is another object of the present invention to provide a video camera having a stroboscopic flash, including a strobe device for illuminating a subject with a flashing light, a movie-photography triggering signal generating and still-photography triggering signal generating used to enable still photography during a movie photography operation, a light-quantity measuring unit for energizing the movie-photography triggering signal generator so as to measure light quantity from the subject during the movie photography operation, and a determining unit for determining based on information about the light quantity measured by the light-quantity measuring means whether or not strobe photography is required during a still photography operation, whereby the still-photography triggering signal generator is turned on to produce a still-photography triggering signal so as to be supplied to the determining unit, thereby still-photographing the subject with a flashing light produced by the strobe device during the movie photography operation.

It is a further object of the present invention to provide a video camera further including a charging instructing unit for instructing the strobe device to initiate a charging operation in response to the information about the light quantity measured by the light-quantity measuring unit when the determining unit determines that the strobe photography is required.

It is a still further object of the present invention to provide a video camera further including a display for displaying thereon the level of charging of the strobe device together with a photographed image when the determining unit determines that the strobe photography is needed.

It is a still further object of the present invention to provide a video camera recorder wherein the charging instructing unit instructs the strobe device to initiate the charging operation based on charging current supplied to a strobe charging unit from a control unit of a video camera stage.

It is a still further object of the present invention to provide a video camera wherein the display comprises a viewfinder and a character generator.

It is a still further object of the present invention to provide a video camera wherein the display is so constructed that in the viewfinder, one of two charging levels indicative of the minimum and maximum levels is represented by EMPTY abbreviated as "E", whereas the other thereof is represented by FULL abbreviated as "F", and the level of the charging of the strobe device is represented according to the rate of areas divided within a given graphic pattern.

It is a still further object of the present invention to provide a video camera wherein the display is activated to visually indicate a mark by flashing of light in the viewfinder when the strobe device has fully been charged.

It is a still further object of the present invention to provide a video camera wherein the display is activated to digitally indicate the level of the charging of the strobe device in terms of percentage in the viewfinder.

It is a still further object of the present invention to provide a video camera wherein the display is activated to successively visually indicate triple circles by flashing of light in the viewfinder in accordance with an increase in the level of the charging of the strobe device.

It is a still further object of the present invention to provide a video camera having a stroboscopic flash, including a first element for generating a movie-photography triggering signal so as to initiate a movie photography operation, a second element for measuring the quantity of light reflected from a subject with a light-quantity measuring unit when the movie photography is being carried out, a third element for determining based on information about the light quantity whether or not strobe photography is needed at the time of a still photography operation, and a fourth element for initiating the charging of a strobe device when the third element determines that the strobe photography is needed.

It is a still further object of the present invention to provide a method of photographing a subject with a video camera having a stroboscopic flash, the method comprising the following steps of generating a movie-photography triggering signal so as to initiate a movie photography operation, measuring the quantity of light reflected from a subject with a light-quantity measuring unit when the movie photography operation is being carried out, determining based on information about the light quantity whether or not strobe photography is required at the time of a still photography operation, initiating the charging of a strobe device when the determining step determines that the strobe photography is needed, and displaying the level of charging of the strobe device together with a photographed image. Further scope of applicability of the present invention will become apparent from the detailed description given hereinafter. However, it should be understood that the detailed description and specific examples, while indicating perferred embodiments of the invention, are given by way of illustration ony, sincee various changs and modification within the sppirit and scope of the invention will become apparent to those skilled in the art from this detailed description.

BRIEF DESCRIPTION OF THE DRAWINGS

The above and other objects, features and advantages of the present invention will become apparent from the following description and the appended claims, taken in conjunction with the accompanying drawings in which preferred embodiment of the present invention is shown by way of illustrative example only, and are thus not limitative of the present invention, and wherein:

DETAILED DESCRIPTION OF THE PREFERRED EMBODIMENTS

Figure 1:
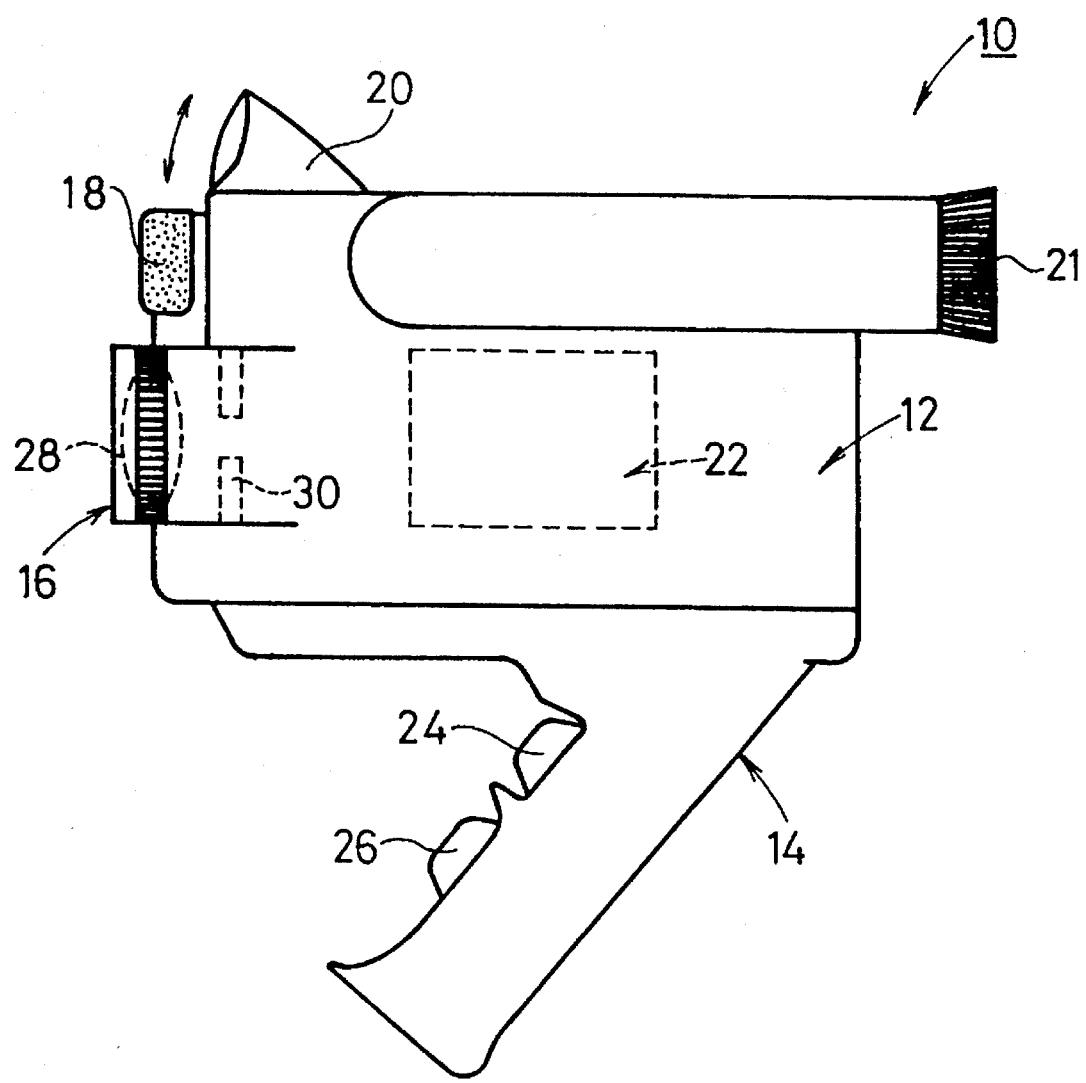
FIG. 1 is a diagram illustrating the side of a video camera having a stroboscopic flash, according to one embodiment of the present invention.

In FIG. 1, reference numeral 10 indicates a video camera having an stroboscopic flash according to one embodiment of the present invention. The camera 10 basically comprises a camera body 12 and a grip 14. The camera body 12 is provided with a photographing optical system 16, a highly directional microphone 18, an opening and closing strobe 20, and a viewfinder 21 serving as a display. In addition, a video cassette 22 is loaded in the camera body 12. The grip 14 includes a movie photographing trigger 24 serving a movie photographing button, and a still photographing trigger 26 for initiating still photography. The movie photographing trigger 24 and the still photographing trigger 26 are formed by a single operating mechanism, and can be constructed in such a manner as to initiate the movie photography and the still photography based on their operational conditions.

Figure 2:
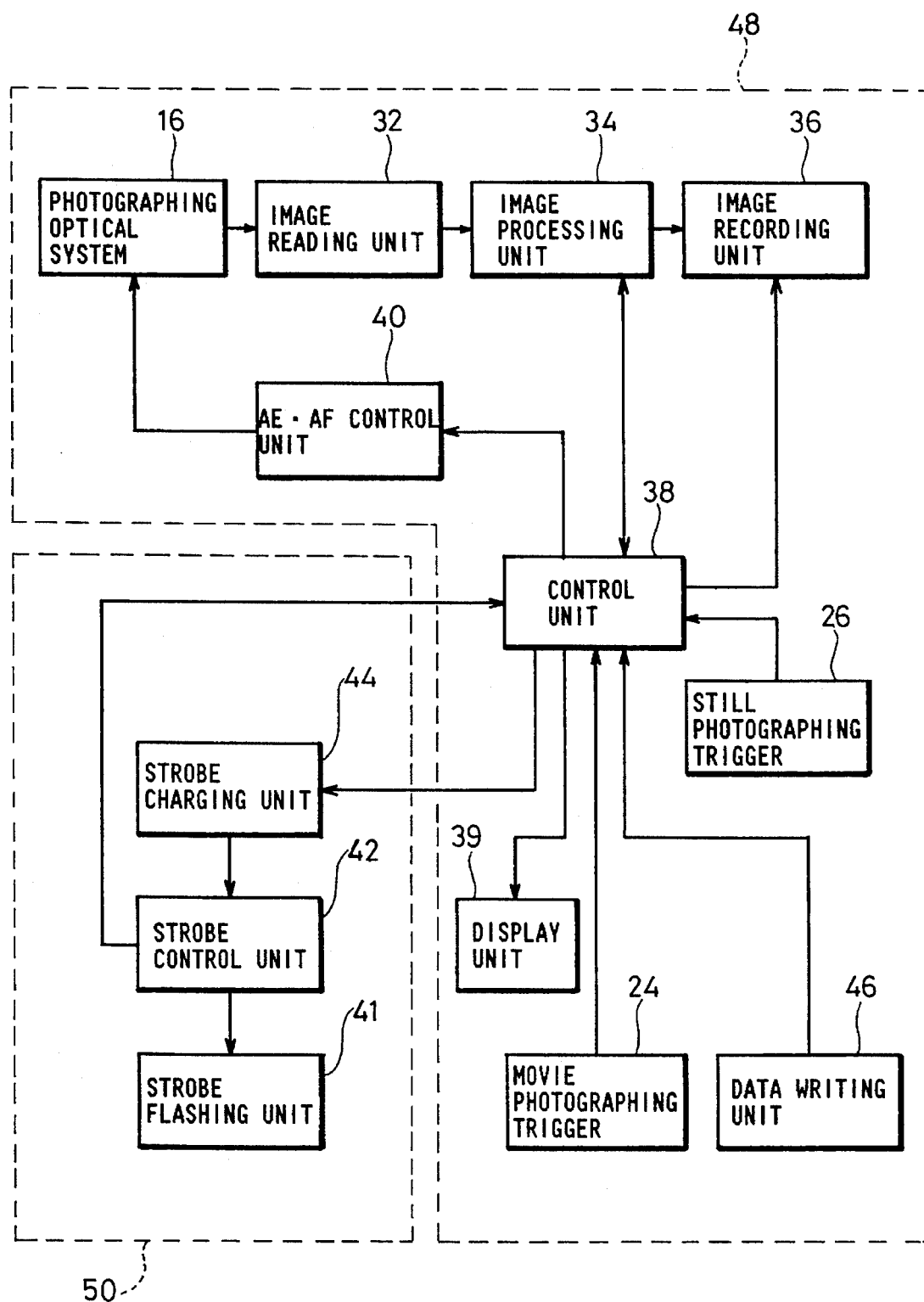
FIG. 2 is a block diagram illustrating the video camera shown in FIG. 1.

The photographing optical system 16 includes a phototaking or converging lens 28 and a diaphragm 30. As shown in FIG. 2, light reflected from a subject or object is focused on an image reading unit 32 having a CCD through the photographing optical system 16. An image processing unit 34 serving as a light-quantity measuring means is electrically connected to the image reading unit 32, whereas an image recording unit 36 is electrically connected to the image processing unit 34. The image recording unit 36 has a magnetic head (not shown) for recording an image signal on a video tape (not shown) of the video cassette 22 loaded therein. The image processing unit 34 and the image recording unit 36 are electrically connected to a control unit 38 serving as a determining means and/or a charging instructing means. Connected to the control unit 38 are an AE·AF control unit 40 for actuating the diaphragm 30 and the converging lens 28 and a display unit 39 for displaying the level at which the strobe has been charged based on a charging start instruction. The display unit 39 comprises the viewfinder 21 and a character generator 43 to be described later (see FIG. 4). In addition, the AE·AF control unit 40 is provided with an unillustrated AE mechanism.

The still photographing trigger 26 for initiating the still photography while the movie photography is being carried out, is electrically connected to the control unit 38, which is, in turn, activated to set the shutter speed to a desired value when an image from the photographing optical system 16 is input to the image reading unit 32. Further, a strobe stage 50 comprises a strobe flashing unit 41, a strobe control unit 42 and a strobe charger or strobe charging unit 44. The strobe flashing unit 41 is electrically connected to the strobe control unit 42, whereas the strobe control unit 42 is electrically coupled to the strobe charging unit 44 and the control unit 38. In addition, the movie photographing trigger 24 and a data writing unit 46 are electrically connected to the control unit 38.

The operation of the camera 10, which has been constructed as described above, will now be described below in connection with a method of photographing an object with the camera.

First of all, the image recording unit 36 incorporated in the camera body 12 of the camera 10 is loaded with the video cassette 22. Thereafter, the photographer holds firmly the grip 14 of the camera 10 to turn ON the movie photographing trigger 24. When the movie photography operation is initiated, the control unit 38 is activated to supply a desired signal to the AE·AF control unit 40 so as to actuate the diaphragm 30 and the converging lens 28. Then, light from the object passes through the converging lens 28 and the diaphragm 30 of the photographing optical system 16, and is focused on the image reading unit 32 so as to be photoelectrically read. Further, the photoelectrically-read light is introduced into the image processing unit 34, where it is converted into an image signal, followed by introducing into the image recording unit 36. The image recording unit 36 serves to record the image signal on a video tape by means of the unillustrated magnetic head.

A description will now be made in a case where the photographer turns ON the still photographing trigger 26 during the movie photography operation so as to initiate the still photography.

Figure 3:
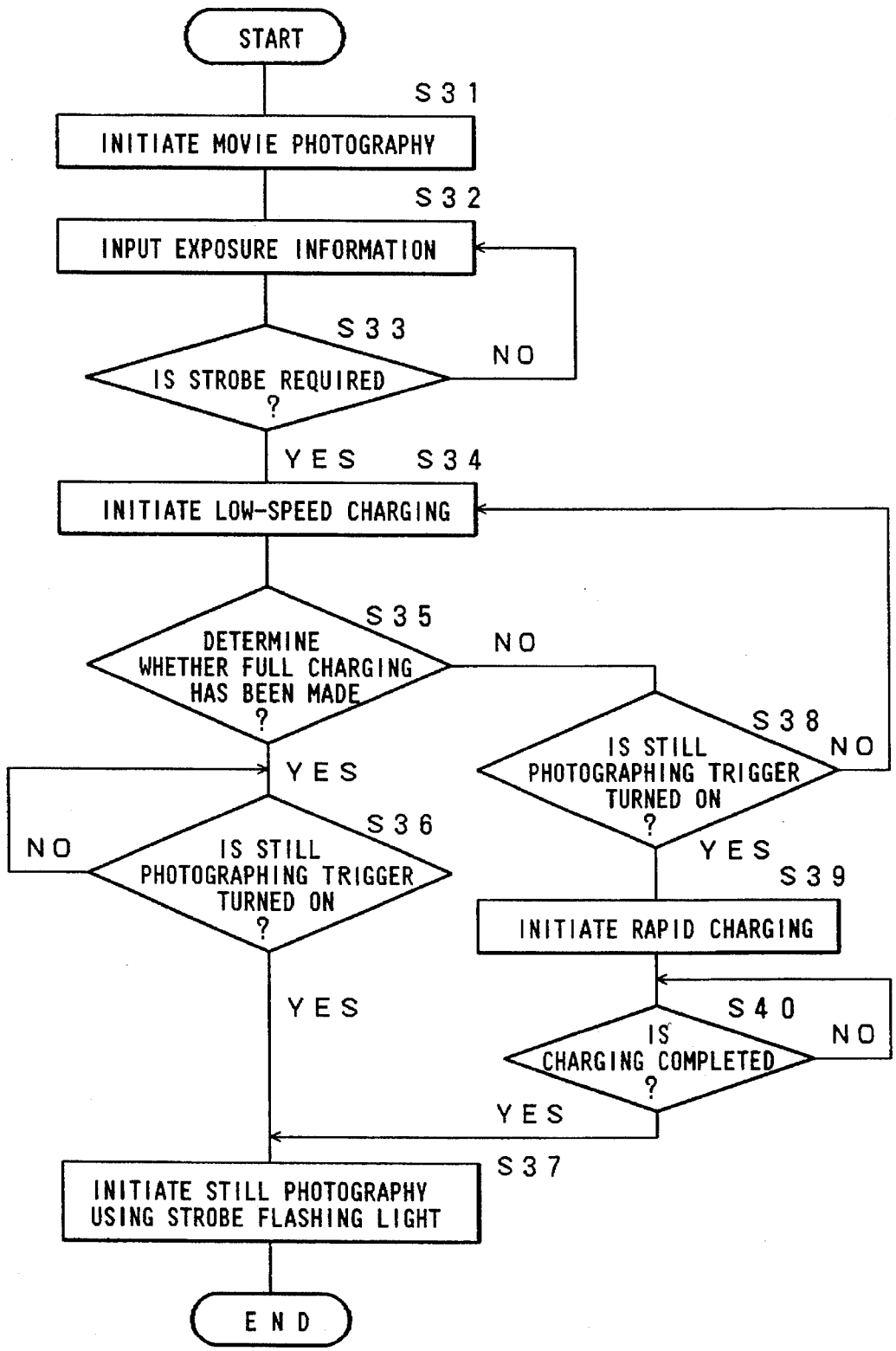
FIG. 3 is a flowchart for describing the operation of the video camera depicted in FIG. 1.

FIG. 3 is a flowchart for describing the operation of the camera in which the strobe stage 50 is charged without mixing the microphone 18 with noise produced therefrom when the movie photography operation is being carried out, followed by visually checking on the level at which the strobe stage 50 has been charged, whereby the strobe photography can momentarily be performed when it is desired to carry out desired still photography.

STEP S31

As described above, the movie photographing trigger 24 is turned ON to initiate a movie photographing operation.

STEP S32

Information about the measured light quantity, which is obtained in the image processing unit 34, is input to the control unit 38.

STEP S33

The control unit 38 determines based on the information in Step S32 whether or not the flashing light of the strobe is required when the still photography is carried out in the course of the movie photography. That is, it is determined by the control unit 38 whether or not improper exposures such as underexposure, backlight, etc. have been brought about. If it is determined to be yes, then the flashing light of the strobe is required as auxiliary light. Therefore, the routine procedure proceeds to Step S34. When the strobe flashing light is not required, proper exposures have been ensured. Therefore, the routine procedure returns to Step S32 referred to above, where the control unit 38 is held ready to display the improper exposures on the screen.

STEP S34

Figure 4:
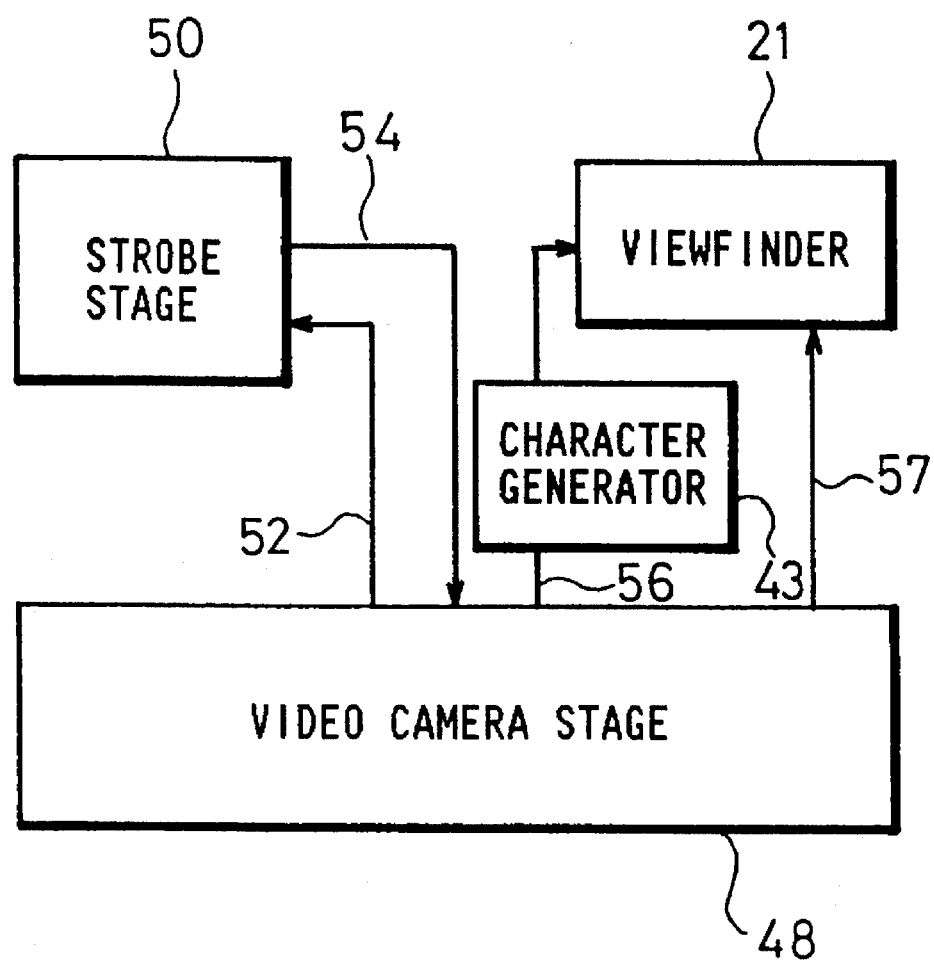
FIG. 4 is a block diagram for describing the sequence of charging operation of the video camera shown in FIG. 1.

When it is judged in Step S33 that the flashing light is required owing to the underexposure or the like during the still photography operation, the control unit 38 supplies a desired signal to the strobe charging unit 44 in such a manner that the strobe charging unit 44 is charged at a low speed. As shown in FIG. 4, the input of the signal to the strobe charging unit 44 from the control unit 38 is carried out by using charging current 52 which flows into the strobe charging unit 44 of the strobe stage 50 from the control unit 38 of a video camera stage 48. It is therefore possible to charge a strobe battery in order to provide for the still photography while the movie photography is being carried out. In the present embodiment, the strobe charging unit 44 is charged at the low speed based on the information referred to above when the movie photography operation is being performed, so that a peculiar sound vibration as noise electrically induced upon its charging process can be reduced. Thus, the still photography can be performed without mixing the microphone with the noise during the movie photography operation. Incidentally, the strobe stage 50 comprises the strobe flashing unit 41, the strobe control unit 42 and the strobe charging unit 44 (see FIG. 2). The video camera stage 48 comprises the strobe stage 50 and other components other than the display unit 39 comprised of the viewfinder 21 and the character generator 43.

STEP S35

It is determined in Step S35 whether or not the strobe charging unit 44 has completely been charged after the low-speed charging thereof in Step S34 has been finished. That is, the strobe control unit 42 makes this judgment. If the answer is determined to be yes in Step S35, then the routine procedure proceeds to Step S36. If the answer is determined to be no, then the routine procedure proceeds to Step S38. Thus, judgments to be made as to the levels of stepwise charging of the strobe charging unit 44, including the judgment to be made as to whether or not the strobe charging unit 44 has fully been charged, are made by supplying a charge level signal 54 to the control unit 38 of the video camera stage 48 from the strobe control unit 42 of the strobe stage 50 as shown in FIG. 4. The control unit 38 makes a judgment in response to the signal 54 as to whether the strobe charging unit 44 has properly been charged. Then, the control unit 38 transfers the result of its judgment to the character generator 43 as indicator information 56. The viewfinder 21 serves to indicate the charged level of the strobe charging unit 44 by making use of characters, graphics, etc. generated from the character generator 43 based on the indicator information 56. Incidentally, reference numeral 57 indicates an image signal supplied to the viewfinder 21 from the control unit 38.

STEP S36

When it is desired to still-photograph a desired object in accordance with Steps S31 through S35 executed during the movie photography operation, the still photographing trigger 26 is turned ON to supply a triggering signal to the control unit 38. If the still photographing trigger 26 remains OFF, then it is placed in a waiting state before the execution of Step S36 in such a manner that it can be turned ON at all times.

STEP S37

When the still photographing trigger 26 is turned ON in Step S36, the still photography is initiated for each frame with the strobe flashing light produced from the strobe flashing unit 41.

Now, prior to the initiation of the still photography, the photographer can easily confirm the level at which the strobe stage 50 has been charged, on the basis of the representation of the charged level in the viewfinder 21.

FIGS. 5(a) through 5(d) show specific examples of the representation of the charged levels in the viewfinder 21. In the same drawings, each of rectangles represents a liquid-crystal type monitor 58 of the viewfinder 21. The levels at which the strobe stage 50 has been charged are respectively represented at the corners of the monitors 58 as viewed in upper positions on the left sides thereof.

Figure 5A:
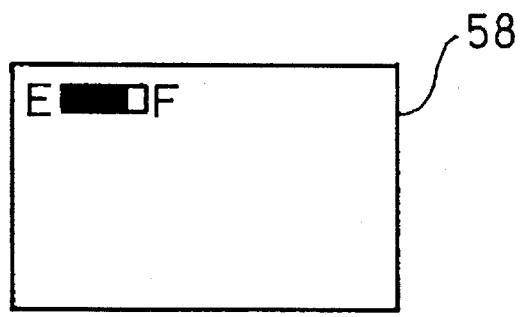
FIG. 5 is a diagram for describing respective viewfinders used to show different levels charged in the video camera.
Figure 5B:
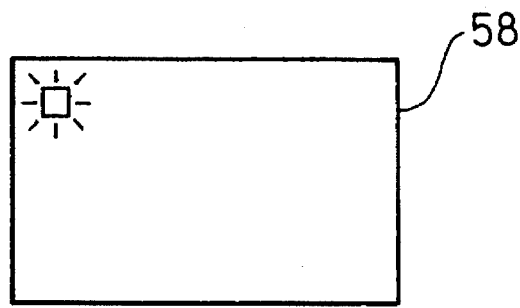
Figure 5C:
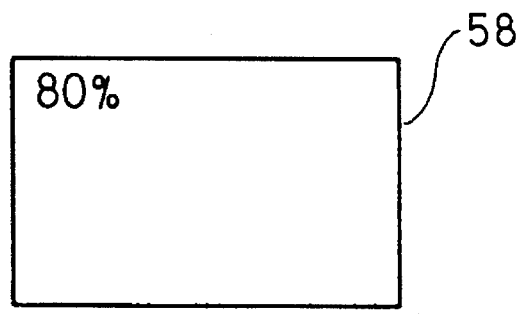
Figure 5D:
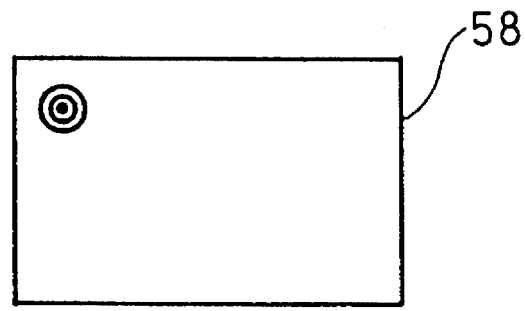

A description will now be made of FIGS. 5(a) through 5(d). FIG. 5(a) shows a case in which one of two charging levels indicative of the minimum and maximum levels is represented by EMPTY (abbreviated as "E" in FIG. 5(a)), whereas the other thereof is represented by FULL (abbreviated as "F" in FIG. 5(a)), and the level of the charging of the strobe stage 50, which increases with the low-speed charging, is represented by ■ in FIG. 5(a). Thus, the level at which the strobe stage 50 has been charged can be recognized according to the rate of the ■ region. FIG. 5(b) illustrates a case in which the level at which the strobe stage 50 has fully been charged is represented by a mark shown in the drawing which appears by flashing a light. Accordingly, the photographer can momentarily still-photograph an object with a strobe whenever light is flashed to indicate the mark. FIG. 5(c) shows a case in which the level of the charging of the strobe stage 50 is represented in terms of percentage and its result is expressed in digital form. Thus, the photographer can confirm based on the level represented in terms of percentage at a glance at which level the strobe stage 50 is being charged at present. FIG. 5(d) illustrates a case in which the completion of the charging of the strobe stage 50 is represented by triple circles illuminated with a flashing light. That is, the triple circles are successively indicated by this illuminating operation in accordance with an increase in the level charged at the low speed, thereby making it possible to confirm at which level the strobe stage 50 is being charged at present.

When the level of the charging of the strobe stage 50 is represented in stepwise and fine manners as described above, it is possible to determine in advance how long it takes to change from the movie photography operation to the still photography operation using the strobe if the strobe charging unit 44 has not fully been charged.

STEP S38

Even when it is desired to still-photograph a desired object in a state in which the strobe charging unit 44 has not fully been charged in Step S35, the still photographing trigger 26 is turned ON in the same manner as described above so as to supply a triggering signal to the control unit 38. If the still photographing trigger 26 is now in an OFF state, then the routine procedure returns to Step S34, where the strobe charging unit 44 continues its charging process at the low speed again.

STEP S39

Even if the still photographing trigger 26 is turned ON in Step S38, the rapid charging of the strobe charging unit 44 is initiated when the charging of the strobe charging unit 44 has not been completed. The still photography operation has already been set up in Step S38 even when the rapid charging of the strobe charging unit 44 is made as described above. Therefore, there is no risk of mixing the microphone with sound vibrations as noise produced upon charging the strobe charging unit 44.

STEP S40

It is determined in Step S40 whether or not the strobe charging unit 44 has fully been charged by the rapid charging carried out in Step S39. If the answer is determined to be yes, then the routine procedure proceeds to Step S37, where the still photography operation is performed with the flashing light of the strobe. If the answer is determined to be no, then the routine procedure returns to a rapid charging step again.

The camera according to the present invention can bring about the following advantageous effects.

A strobe can be set to either a fully-charged state or a substantially charged state when the movie photography is being carried out. Thus, when the still photography is initiated in the course of the movie photography, the strobe photography can automatically and immediately be performed upon the still photography. Accordingly, when a photographer takes an intended subject or object upon the movie photography, it is unnecessary to confirm whether or not a proper exposure state has been set up, e.g., improper exposures such as underexposure, backlight, etc. have been brought about. In addition, the still photography can immediately be initiated without the need for the strobe charging time.

Since the strobe is charged during the movie photography operation, the strobe charging time can sufficiently be rendered longer. In addition, the durability of a battery can greatly be improved as compared with a conventional battery by reducing a load applied to the battery.

Further, when it is desired to still-photograph a subject with the automatic flashing light of the strobe, the level of the charging of the strobe stage 50 can easily and reliably be confirmed by a displaying means in the viewfinder 21.

Having now fully described the invention, it will be apparent to those skilled in the art that many changes and modifications can be made without departing from the spirit or scope of the invention as set forth herein.

What is claimed is:

1. A video camera, for producing a video movie signal of a subject during movie photography, having an iris controlled on the basis of detected brightness of the subject, said video movie signal being processed and recorded on a recording medium, the video camera being capable of recording still photography on said recording medium during movie photography using a stroboscopic flash, the video camera comprising:

strobe means for generating the stroboscopic flash and having charging means for electrically charging said strobe means;

charging control means for automatically controlling said charging means to charge said strobe means when the brightness of the subject detected during movie photography is low; and still photography trigger signal generating means for controlling the video camera to record the still photography on said recording medium using a stroboscopic flash when charging of said strobe means has been completed.

2. The video camera according to claim 1, further comprising:

determining means, coupled to said charging control means, for determining in accordance with the brightness of the subject whether strobe photography is needed, wherein a stroboscopic flash is used during still photography.

3. The video camera according to claim 2, further comprising:

display means for displaying thereon a level of charging of said strobe means together with a photographed image when said determining means determines that strobe photography is needed.

4. The video camera according to claim 1, wherein said charging control means instructs said strobe means to initiate a charging operation based on charging current supplied to said charging means.

5. The video camera according to claim 3, wherein said display means comprises viewfinder means and character generating means.

6. The video camera according to claim 3 or 5, wherein said display means displays in said viewfinder means one of two charging levels indicative of minimum and maximum levels represented by EMPTY abbreviated as "E" and FULL abbreviated as "F", and the level of charging of said strobe means is represented according to a rate of areas divided within a given graphic pattern.

7. The video camera according to claim 3 or 5, wherein said display means is activated to visually indicate a mark by flashing of light in said viewfinder means when said strobe means has been fully charged.

8. The video camera according to claim 3 or 5, wherein said display means is activated to digitally indicate in said viewfinder means a level of charging of said strobe means in terms of percentage.

9. The video camera according to claim 3 or 5, wherein said display means is activated to successively visually indicate triple circles by flashing of light in said viewfinder means in accordance with an increase in a level of charging of said strobe means.

10. A video camera, for producing a video movie signal of a subject during movie photography, having an iris controlled on the basis of detected brightness of the subject, said video movie signal being processed and recorded on a recording medium, the video camera being capable of recording still photography on said recording medium during movie photography using a stroboscopic flash generated by strobe means, the video camera comprising:

first means for generating a movie-photography trigger signal to initiate a movie photography operation;

second means, coupled to said first means, for automatically detecting the brightness of light reflected from the subject when movie photography is performed;

third means for determining whether strobe photography is needed at the time of still photography operation in accordance with the detected brightness of the subject; and fourth means for initiating charging of the strobe means when said third means determines that strobe photography is needed.

11. A method of photographing a subject with a video camera which produces a video movie signal of a subject during movie photography and has an iris controlled on the basis of a detected brightness of the subject, the video movie signal being processed and recorded on a recording medium, the video camera being capable of recording still photography on the recording medium during movie photography using a stroboscopic flash generated by strobe means, the method of photographing comprising the steps of:

generating a movie-photography trigger signal to initiate a movie photography operation;

automatically detecting the brightness of light reflected from the subject when the movie photography operation is being carried out;

determining whether strobe photography is required at the time of still photography operation in accordance with the detected brightness of the subject;

initiating charging of the strobe means when it is determined in said determining step that strobe photography is needed; and displaying a level of charging of the strobe means together with a photographed image.

* * * * *